United States Patent [19]

Mossman

[11] Patent Number: 5,775,076
[45] Date of Patent: Jul. 7, 1998

[54] FENDER EXTENSION FOR A CORN HARVESTER

[75] Inventor: Michael Wayne Mossman, Silvis, Ill.

[73] Assignee: Deere & Company, Moline, Ill.

[21] Appl. No.: 644,505

[22] Filed: May 10, 1996

[51] Int. Cl.$^6$ .................................................. A01D 45/02
[52] U.S. Cl. ................................................. 56/119; 56/314
[58] Field of Search ........................ 56/12.8, 14.1, 56/14.3, 14.6, 16.6, 98, 106, 119, 364

[56] References Cited

U.S. PATENT DOCUMENTS

| | | | |
|---|---|---|---|
| 1,342,640 | 6/1920 | Meilicke | 56/119 |
| 2,133,905 | 10/1938 | Rund, Jr. | 56/119 |
| 2,751,744 | 6/1956 | Reade et al. | 56/119 |
| 2,867,961 | 1/1959 | Heilbrun . | |
| 3,462,922 | 8/1969 | Phillips et al. . | |
| 3,759,021 | 9/1973 | Schreiner et al. . | |
| 4,037,393 | 7/1977 | Anderson | 56/119 |
| 4,137,695 | 2/1979 | Sammann . | |
| 4,255,920 | 3/1981 | Janzen . | |
| 4,346,548 | 8/1982 | Atkinson . | |
| 4,493,181 | 1/1985 | Glendenning et al. | 56/119 X |
| 5,195,309 | 3/1993 | Mossman . | |
| 5,444,968 | 8/1995 | Barton | 56/119 |

OTHER PUBLICATIONS

Farm Show Brochure entitled "Combine–Mounted Weed Seed Collector" by Bill Gergen vol. 20, No. 2, 1996.
Article 3–90–14 detailing 40 Series Corn Head (No date).
New Fox Corn Snapper Attachment–Sep. 1970.
Oliver—Operator's Manual 531 and 541 Corn Heads Mar. 1970.
Ford—601 and 602 Corn Pickers Sep. 1966.

*Primary Examiner*—Michael J. Carone
*Assistant Examiner*—Robert Pezzuto

[57] ABSTRACT

A fender extension for a corn harvester. The fender extension is mounted to the semi-conical portion of the end crop divider. The extension itself comprises an angled mounting portion, a cantilevered portion extending rearwardly from the mounting portion, and a flexible sheet hanging downwardly from the cantilevered portion. The angled mounting portion and the cantilevered portion are an integrally formed hollow plastic structure. The angled mounting portion is provided with an outwardly extending mounting lip which is bolted to the semi-conical portion. The cantilevered portion is provided with a downwardly depending lip to which the flexible sheet is mounted.

14 Claims, 3 Drawing Sheets

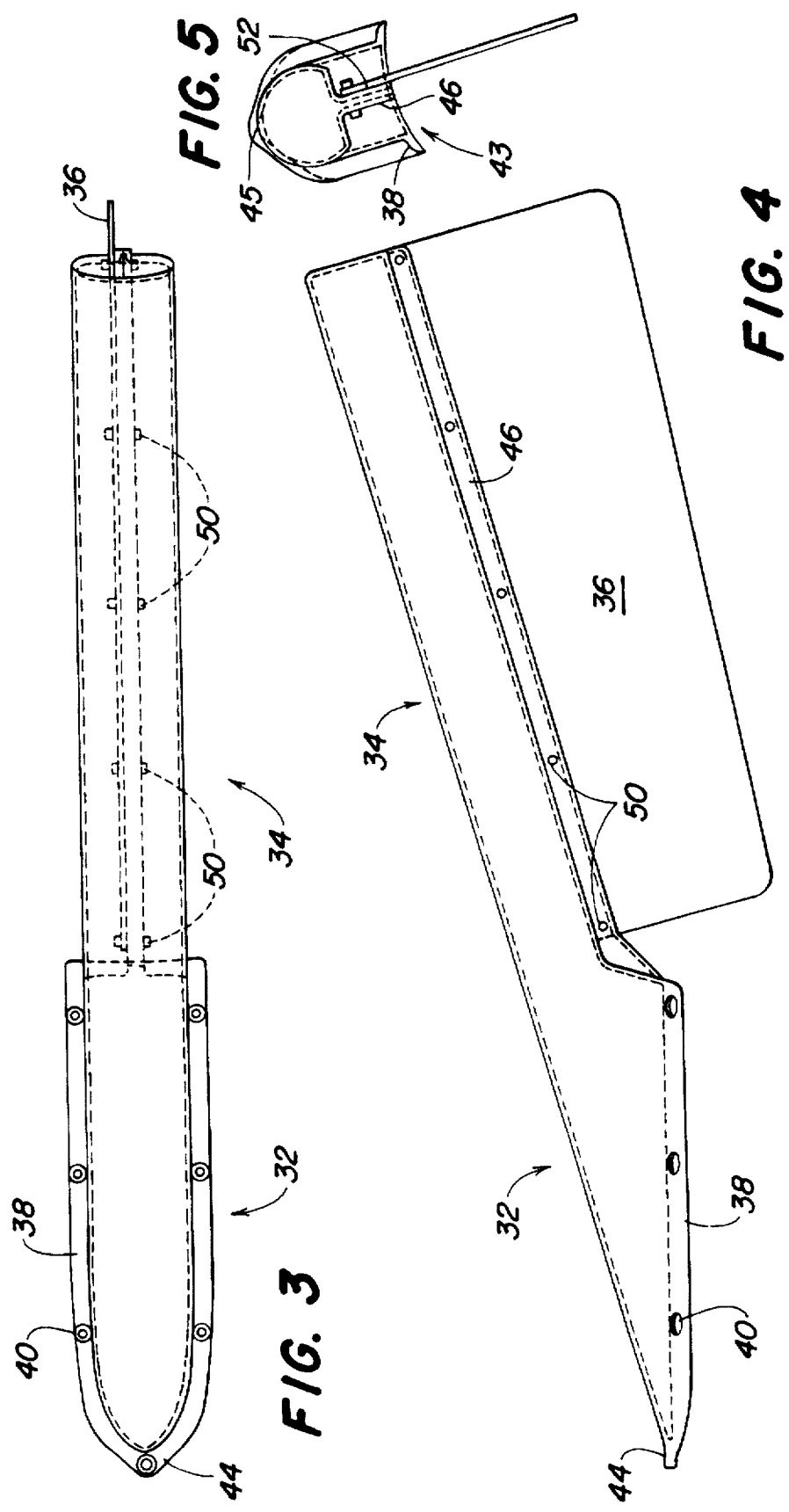

5,775,076

FENDER EXTENSION FOR A CORN HARVESTER

BACKGROUND OF THE INVENTION

1. Field of the Invention:

The invention is directed to a plastic fender extension for a corn harvester that is mounted to the semi-conical portion of the end divider.

2. Description of the Prior Art:

Agricultural harvesting machines, such as combines, maybe provided with a corn harvester for harvesting ears of corn and directing these ears into the combine. A typical corn harvester is provided with a plurality of crop dividers. Adjacent dividers define a crop gathering gap into which the crop being harvested is drawn by gathering chains. Located immediately beneath the gathering chains are deck plates that define a gap smaller than an ear of corn. Snapper rolls are located beneath the deck plates and engage the corn stalk and pull it rapidly downward. When the ear of corn reaches the small gap formed by the deck plates the ear is snapped off and carried to the gathering trough of the corn header by the gathering chains. An auger in the gathering trough directs the ears of corn to the center of the harvester where they are taken into the feederhouse of the combine. The stalk is continually pulled downward and returned to the field by the snapper rolls.

Crop dividers define crop gathering gaps. Crop dividers are typically sheet metal fingers that extend outwardly from the header to direct the crops to the appropriate gathering gaps. Each divider is provided with a semi-conical portion and a semi-cylindrical portion. The row crop dividers furthest outboard from the center of the harvester are called end dividers. A corn harvester having conventional crop dividers is disclosed in U.S. Pat. 3,759,021. U.S. Pat. No. 5,195,309 discloses a corn harvester having rotomolded hollow plastic crop dividers.

In some conditions the ears of corn may bounce over the side of the end divider and be lost. To overcome this problem fender extensions maybe provided which are mounted to the semi-cylindrical portion of the end dividers. Such extensions do not completely cure the problem as ears may fall off before reaching the extensions. In addition, the extensions usually have blunt fronts and ears may bounce off this front.

SUMMARY

It is an object of the invention to provide a fender extension that minimizes harvesting losses by encountering the crop before typical fender extensions.

It is a feature of the present invention that the fender extensions have a more gradual angle of attack than convention extensions.

It is another object of the present invention that the main structure of the fender extension is a hollow self supporting plastic structure that minimizes crop bounce.

The fender extension of the present invention comprises an angled mounting portion having an outwardly extending lip with mounting holes . The angled mounting portion is bolted to the semi-conical portion of an end divider by bolts passing through the mounting holes. A cantilevered portion extends rearwardly from the angled mounting portion overlying the semi-cylindrical portion of the end divider. The cantilevered portion is also provided with a downwardly extending lip. This lip is also provided with mounting holes to which a downwardly extending flexible plastic sheet is mounted by mounting bolts. The sheet contacts the inner wall of the end divider thereby sealing the space between the cantilevered portion and the semi-cylindrical portion of the end divider. The angled mounting portion and the cantilevered portion are an integrally formed hollow plastic structure. This structure is relatively rigid and self supporting having a rounded upper surface.

BRIEF DESCRIPTION OF THE DRAWINGS

FIG. 3 is an enlarged top view of the fender extension.

FIG. 4 is an enlarged side view of the fender extension.

FIG. 5 is an enlarged end view of the fender extension.

DETAILED DESCRIPTION

Figure 1:
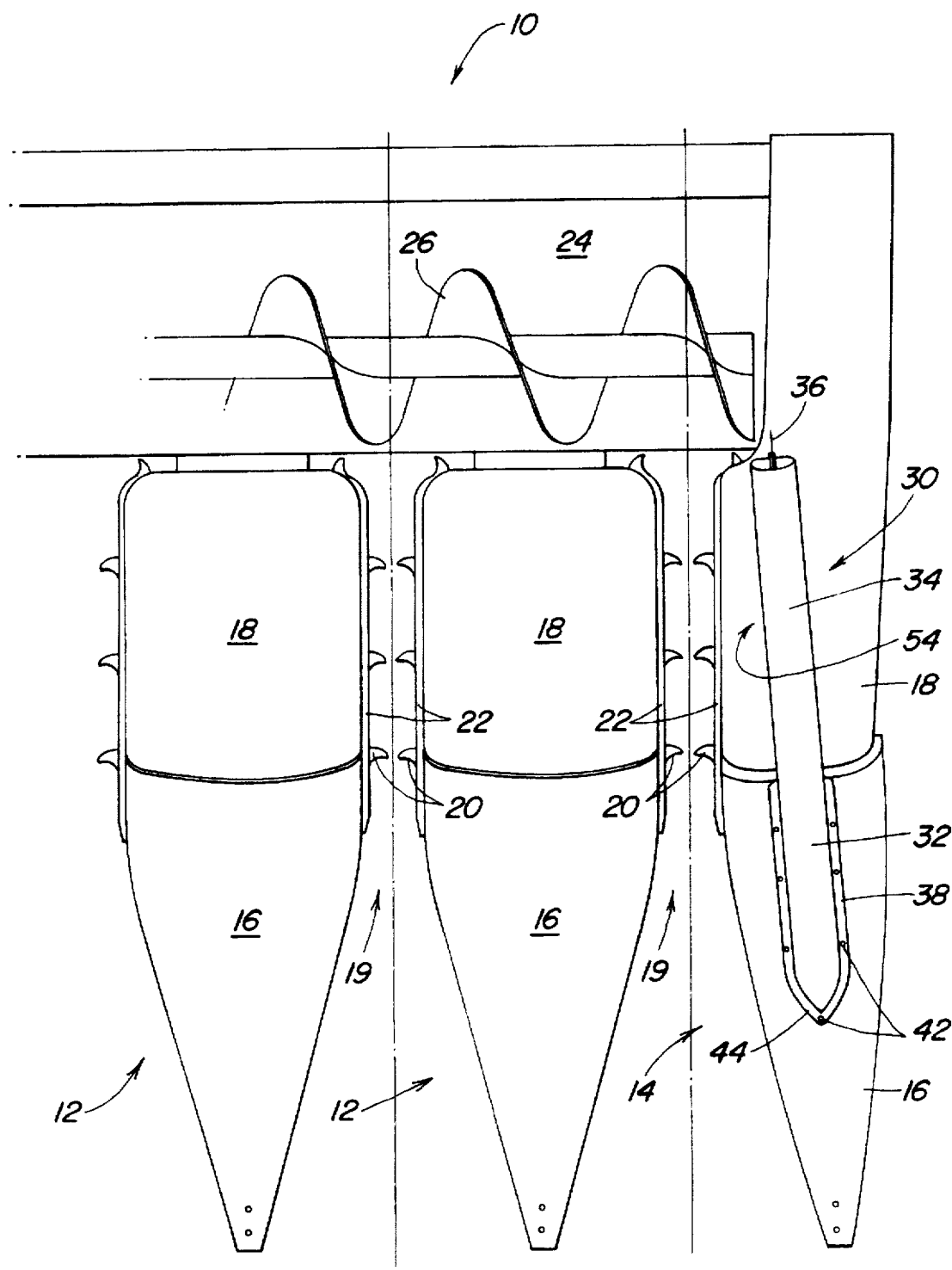
FIG. 1 is a partial top view of a corn harvester having the fender extension of the present invention.
Figure 2:
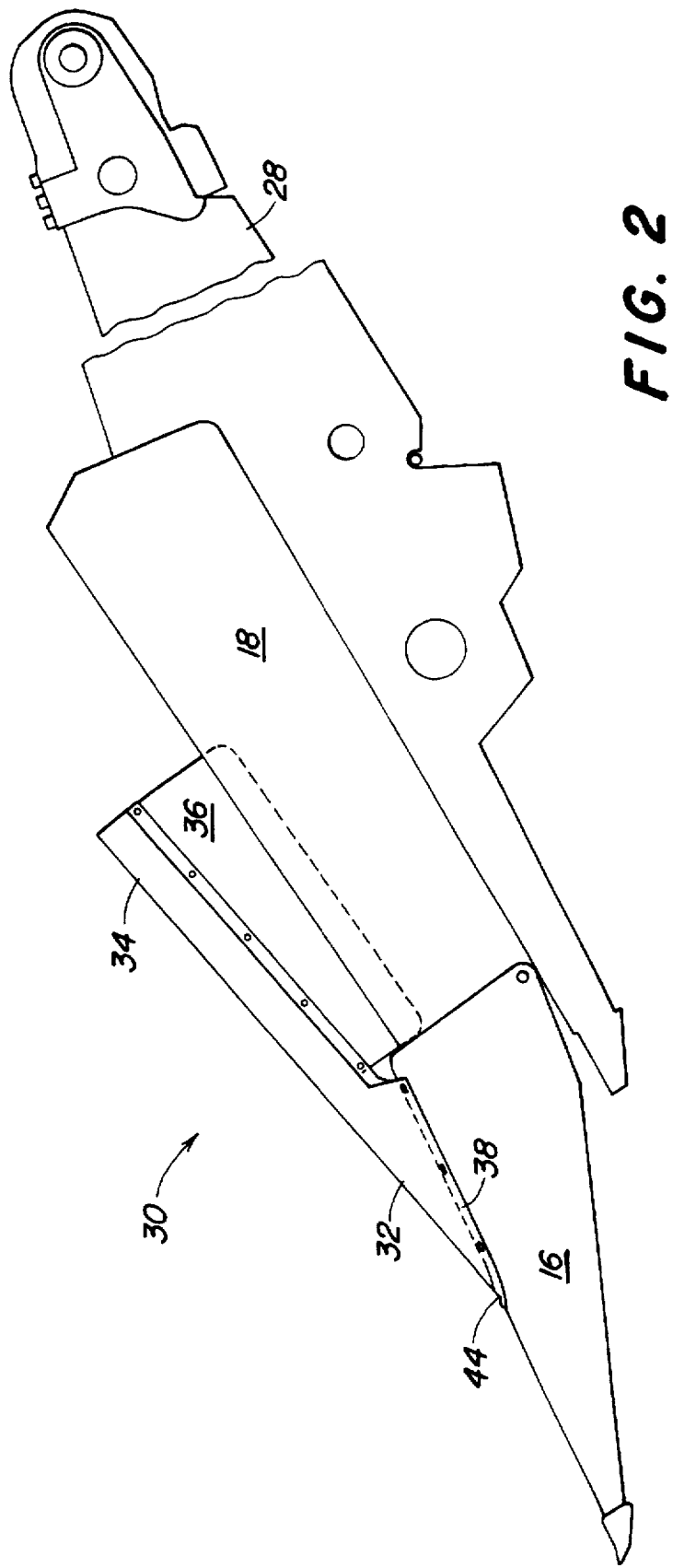
FIG. 2 is a side view of the corn harvester and fender extension.

FIG. 1 shows a corn harvester 10 having two center crop dividers 12 and one end divider 14. Each of the crop dividers have a semi-conical portion 16 and a semicylindrical portion 18. The crop dividers define crop gathering gaps 19 through which the corn stalks enter the harvester. Gathering chains 20 are located in these gaps and draw the corn inwardly. Snapping rolls, not shown, are located beneath the gathering chains and are used to pull the stalks downwardly so that the ears are snapped off by the deck plates 22. The gathering chains then draw the ears upwardly and deposit them in the gathering trough 24. A transverse auger 26 located in the trough 24 directs the ears to the center of the harvester where they are taken up into the combine by the feederhouse 28.

The fender extension 30 comprises an angled mounting portion 32, a cantilevered portion 34 extending rearwardly from the angled mounting portion 32, and a flexible sheet 36 extending downwardly from and rigidly secured to the cantilevered portion 34. The angled mounting portion 32 is provided with an outwardly extending mounting lip 38 having mounting holes 40. The mounting portion 32 is secured to the curved upper surface of the of the semi-conical portion 16 of end divider 14 by mounting bolts 42 passing though mounting holes 40. As illustrated in FIG. 5, the bottom surface 43 of the mounting portion 32 is curved to accommodate the curved upper surface of the semi-conical portion. The tip 44 of the mounting portion 32 is located in the center of the semi-conical portion 16.

Extending rearwardly from the angled mounting portion 32 is the cantilevered portion 34. The cantilevered portion 34 overlies the semi-cylindrical portion 18 of the end divider 14. Portion 34 is a hollow tubular portion having a curved upper surface 45. The bottom of portion 34 is provided with a downwardly extending lip 46 having a series of mounting holes.

The flexible plastic sheet 36 is mounted to the downwardly extending lip 46 of the cantilevered portion 34 by mounting bolts 50. It is mounted to the inner surface 52 of the lip 46 and extends downwardly where it contacts the inner surface 54 of semi-cylindrical portion 18.

The angled mounting portion 32 and the cantilevered portion 34 are an integral hollow structure. This structure is hollow molded plastic part that maybe rotomolded. It has reduced bounce characteristics when compared to conventional metal fender extensions. This structure also forms a more gentle ramp extending from the semi-conical portion than conventional fender extensions.

The present invention provides a superior fender extension and as such should not be limited by the above described embodiment, but should be limited solely by the claims that follow.

I claim:

1. A fender extension for a corn harvester having an end divider, the end divider is provided with a semi-conical portion and a semi-cylindrical portion, the fender extension comprising:

an angled mounting portion adapted to be mounted to the semi-conical portion of the end divider;

a cantilevered portion extending rearwardly from the angled mounting portion to overlie the semi-cylindrical portion of the end divider; and a sheet extending downwardly froma and rigidly secured to the cantilevered portion, into contact with the semi-cylindrical portion of the end divider.

2. A fender extension as defined by claim 1 wherein the cantilevered portion has a rounded upper surface.

3. A fender extension as defined by claim 2 wherein the angled mounting portion has a rounded upper surface.

4. A fender extension as defined by claim 3 wherein the cantilevered portion is integral with the angled mounting portion.

5. A fender extension as defined by claim 4 wherein the angled mounting portion is provided with a lip having a series of mounting holes for securing the angled mounting portion to the semi-conical portion of the end divider.

6. A fender extension as defined by claim 5 wherein the cantilevered portion is provided with a downwardly extending lip having a series of holes for securing the sheet to the cantilevered portion by mounting bolt.

7. A fender extension as defined by claim 6 wherein the semi-cylindrical portion of the end divider is provided with an inner wall and the downwardly extending sheet contacts the inner wall of the end divider.

8. A fender extension as defined by claim 7 wherein the angled mounting portion and the cantilevered portion form a hollow self-supporting plastic structure.

9. A fender extension as defined by claim 8 wherein the angled mounting portion and the cantilevered portion form a relatively rigid self-supporting structure.

10. A fender extension as defined by claim 9 wherein the downwardly extending lip of the cantilevered portion is provided with an inner surface to which the sheet is mounted.

11. A fender extension as defined by claim 10 wherein the angled mounting portion is provided with a curved bottom surface which abuts against the semi-conical portion of the end divider.

12. A fender extension for a corn harvester having an end divider, the end divider is provided with a semi-conical portion and a semi-cylindrical portion, the fender extension comprising:

an integral self-supporting hollow plastic structure that is mounted to the semi-conical portion of the end divider and which extends rearwardly therefrom to overlie the semi-cylindrical portion of the end divider wherein the structure comprises a angled mounting portion that is mounted to the semi-conical portion of the end divider and a cantilevered portion that overlies the semi-cylindrical portion of the end divider; and a sheet extends downwardly from and is rigidly secured to the structure contacting the semi-cylindrical portion of the end divider.

13. A fender extension as defined by claim 12 wherein the angled mounting portion and the cantilevered portion are provided with a curved upper surface.

14. A fender extension as defined by claim 13 wherein the angled mounting portion is provided with a curved bottom surface which abuts against the semi-conical portion of the end divider.

* * * * *